(12) United States Patent
Lee et al.

(10) Patent No.: US 8,346,523 B2
(45) Date of Patent: Jan. 1, 2013

(54) INDIRECT-ERROR-BASED, DYNAMIC UPSCALING OF MULTI-PHASE FLOW IN POROUS MEDIA

(75) Inventors: Seong H. Lee, Berkley, CA (US); Hui Zhou, Stanford, CA (US); Hamdi A. Tchelepi, Belmont, CA (US)

(73) Assignees: Chevron U.S.A. Inc., San Ramon, CA (US); Schlumberger Technology Corporation, Houston, TX (US)

( * ) Notice: Subject to any disclaimer, the term of this patent is extended or adjusted under 35 U.S.C. 154(b) by 583 days.

(21) Appl. No.: 12/551,906

(22) Filed: Sep. 1, 2009

(65) Prior Publication Data

US 2010/0057413 A1    Mar. 4, 2010

Related U.S. Application Data

(60) Provisional application No. 61/093,633, filed on Sep. 2, 2008.

(51) Int. Cl.
*G06G 7/48* (2006.01)

(52) U.S. Cl. .......................................... 703/10
(58) Field of Classification Search .............. 703/1, 2, 703/5, 10, 9; 702/13, 14; 175/50; 367/73
See application file for complete search history.

(56) References Cited

U.S. PATENT DOCUMENTS

| | | | |
|---|---|---|---|
| 2004/0015295 A1* | 1/2004 | Bratvedt et al. | 702/13 |
| 2005/0015231 A1* | 1/2005 | Edwards et al. | 703/10 |
| 2005/0203725 A1* | 9/2005 | Jenny et al. | 703/10 |
| 2006/0056272 A1* | 3/2006 | Hill | 367/73 |
| 2007/0005253 A1* | 1/2007 | Fornel et al. | 702/14 |
| 2008/0167849 A1* | 7/2008 | Hales et al. | 703/10 |
| 2008/0208539 A1* | 8/2008 | Lee et al. | 703/1 |
| 2009/0006053 A1* | 1/2009 | Carazzone et al. | 703/5 |
| 2009/0070086 A1* | 3/2009 | Le Ravalec et al. | 703/10 |
| 2009/0281776 A1* | 11/2009 | Cheng et al. | 703/2 |
| 2009/0288881 A1* | 11/2009 | Mullins et al. | 175/50 |
| 2009/0299714 A1* | 12/2009 | Kelkar et al. | 703/10 |

OTHER PUBLICATIONS

Aarnes et al., "An adaptive multiscale method for simultion of field flow in heterogeneous porous media", 2006.*
Chen wet al., "Adaptive local-global upscaling for general flow in heterogeneous formations", Transport in porous media, 2006.*

* cited by examiner

*Primary Examiner* — Kandasamy Thangavelu
(74) *Attorney, Agent, or Firm* — Craig R. Vander Ploeg; Christopher D. Northcutt

(57) ABSTRACT

Computer-implemented systems and methods are provided for an upscaling approach based on dynamic simulation of a given model. A system and method can be configured such that the accuracy of the upscaled model is continuously monitored via indirect error measures. If the indirect error measures are bigger than a specified tolerance, the upscaled model is dynamically updated with approximate fine-scale information that is reconstructed by a multi-scale finite volume method. Upscaling of multi-phase flow can include flow information in the underlying fine-scale. Adaptive prolongation and restriction operators are applied for flow and transport equations in constructing an approximate fine-scale solution.

20 Claims, 10 Drawing Sheets

INDIRECT-ERROR-BASED, DYNAMIC UPSCALING OF MULTI-PHASE FLOW IN POROUS MEDIA

CROSS-REFERENCE TO RELATED APPLICATION

The present application for patent claims the benefit of provisional patent application U.S. Ser. No. 61/093,633, filed Sep. 2, 2008, which the entirety of the application is incorporated herein by reference.

TECHNICAL FIELD

The disclosure generally relates to computer-implemented simulators for characterizing subsurface formations, and more particularly, to computer-implemented simulators that use multi-scale methods to simulate fluid flow within subsurface formations.

BACKGROUND

Natural porous media, such as subterranean reservoirs containing hydrocarbons, are typically highly heterogeneous and complex geological formations. While recent advances, specifically in characterization and data integration, have provided for increasingly detailed reservoir models, classical simulation techniques tend to lack the capability to honor all of the fine-scale detail of these structures. Various methods and techniques have been developed to deal with this resolution gap.

The use of upscaling has particularly been employed to allow for computational tractability by coarsening the fine-scale resolution of the models. Upscaling of multiphase flow in porous media is highly complex due to the difficulty of delineating the effects of heterogeneous permeability distribution and multi-phase flow parameters and variables. Because the displacement process of multi-phase flow in porous media shows a strong dependency on process and boundary conditions, construction of a general coarse-grid model that can be applied for multi-phase flow with various operational conditions has previously been hampered.

SUMMARY

Computer-implemented systems and methods are provided for an upscaling approach based on dynamic simulation of a model. For example, a computer-implemented system and method can be configured such that the accuracy of the upscaled model is continuously monitored via indirect error measures. An upscaled model is dynamically updated with approximate fine-scale information that is reconstructed by a multi-scale finite volume method if indirect error measures are bigger than a specified tolerance. The upscaling of multi-phase flow includes flow information in the underlying fine-scale. Adaptive prolongation and restriction operators are applied for flow and transport equations in constructing an approximate fine-scale solution.

As another example, a system and method can include creating a fine grid defining a plurality of fine cells, a coarse grid defining a plurality of coarse cells (the coarse cells having interfaces between the coarse cells, and being aggregates of the fine cells), and a dual coarse grid defining a plurality of dual coarse control volumes (the dual coarse control volumes being aggregates of the fine cells and having boundaries bounding the dual coarse control volumes). In this example, dual basis functions can be calculated on the dual coarse control volumes by solving local elliptic problems. A model is computed over the coarse grid in at least two timesteps. The model can include one or more variables representative of fluid flow in the subsurface reservoir, wherein at least one of the variables is representative of fluid flow being responsive to the calculated dual basis functions.

For a timestep, computing a model can include partitioning coarse cells of a coarse grid into regions by applying at least one adaptivity criteria to variables of the model. The regions can include a first region corresponding to coarse cells in which a displacing fluid injected into the subsurface reservoir has not invaded, and a second region corresponding to coarse cells in which the displacing fluid has invaded. A boundary between the first region and the second region can be established at the interface between coarse cells that satisfy a first adaptivity criterion. Computing the model can further include updating at least one coarse-scale variable of the model in the second region with at least one respective fine-scale variable that is reconstructed over the second region and is associated with the fine cells. The computed model, which includes the updated at least one coarse-scale variable, can model fluid flow in the subsurface reservoir for each timestep.

The first adaptivity criterion can be satisfied when a change in saturation across an interface between the two coarse cells is above a first predetermined saturation threshold. The at least one respective fine-scale variable can be reconstructed based on a non-linear interpolation.

The regions can further include a third region corresponding to coarse cells in which the displacing fluid has swept the cells. A boundary between the second region and the third region can be established at the interface between coarse cells that satisfy a second adaptivity criterion. The second adaptivity criterion can be satisfied when a change in saturation across an interface between the two coarse cells is below a second predetermined saturation threshold and a change in velocity across the interface is below a predetermined velocity threshold. For this example, computing the model can include updating at least one coarse-scale variable in the third region using a linear interpolation of the at least one coarse-scale variable in the third region. In another example, computing the model can include updating at least one coarse-scale variable in the third region by an asymptotic expansion of the at least one coarse-scale variable in the third region.

As another example, a method and system can include outputting or displaying the computed model including the updated at least one coarse-scale variable or variables representative of fluid flow in the subsurface reservoir including the updated at least one coarse-scale variable.

A model can include one or more fluid flow equations and one or more transport equations. A coarse-scale variable can be transmissibility, pressure, velocity, fractional flow, and/or saturation. When a coarse-scale variable is pressure, the fine-scale pressure can be reconstructed by applying a pressure restriction operator that is a point sampling at the center of the coarse cells. When a coarse-scale variable is velocity, the fine-scale velocity can be reconstructed by applying a velocity restriction operator that is the sum of velocity at the interface of the coarse cells. When a coarse-scale variable is saturation, the fine-scale saturation can be reconstructed by applying a saturation restriction operator that is the volume average saturation for the coarse cells. Additionally, the coarse-scale fractional flow can be updated based on the reconstructed saturation distribution in the fine-scale. When a coarse-scale variable is fractional flow and saturation, the fractional flow curve on the coarse grid in a timestep can be estimated from changes in the saturation on the coarse grid from a previous timestep.

For this example, updating at least one coarse-scale variable of the model in the second region with a fine-scale variable can include applying a respective prolongation operator to the at least one coarse-scale variable to provide the fine-scale variable on the fine grid, applying a finite volume method to the respective fine-scale variable over the fine cells to provide at least one respective fine-scale solution for the fine-scale variable, and applying a respective restriction operator to the fine-scale solution to the fine-scale variable to provide an updated coarse-scale variable. The respective prolongation operator can be a linear combination of calculated dual basis functions. The model can include one or more flow equations and one or more transport equations, where the at least one respective fine-scale variable includes pressure, velocity, and saturation. Applying a finite volume method to the at least one respective fine-scale variable can include providing a pressure solution, constructing a fine-scale velocity field from the pressure solution, and solving the one or more transport equations on the fine-grid using the constructed fine-scale velocity field.

Computing the model (which includes the one or more variables representative of fluid flow in the subsurface reservoir over the partitioned regions to provide the computed model having the updated coarse-scale variable) can increase the efficiency and accuracy of the computation and reduce computational expense.

As an illustration of an area of use for such techniques, the techniques can be used with methods of operating a subsurface reservoir to achieve improved displacement of a reservoir fluid (e.g., oil) by a displacing fluid injected into the subsurface reservoir (e.g., water). With such an application, a system and method can execute the steps of any of the foregoing techniques, and applying to a subsurface reservoir a displacing fluid process according to operational conditions corresponding to the computed model including the updated at least one coarse-scale variable that results from implementing the foregoing methods and systems. The operational conditions can include, but are not limited to, the displacing fluid injection rate, the reservoir fluid production rate, the location of the injection of the displacing fluid, the location of the production of the reservoir fluid, displacing fluid fractional flow curve, reservoir fluid fractional flow curve, displacing fluid and reservoir fluid saturations at different respective fronts during operation of the subsurface reservoir, front shape, and displacing fluid and reservoir fluid saturations at different pore volumes injected (PVI), or at different timesteps, during operation of the subsurface reservoir.

DETAILED DESCRIPTION

Figure 1:
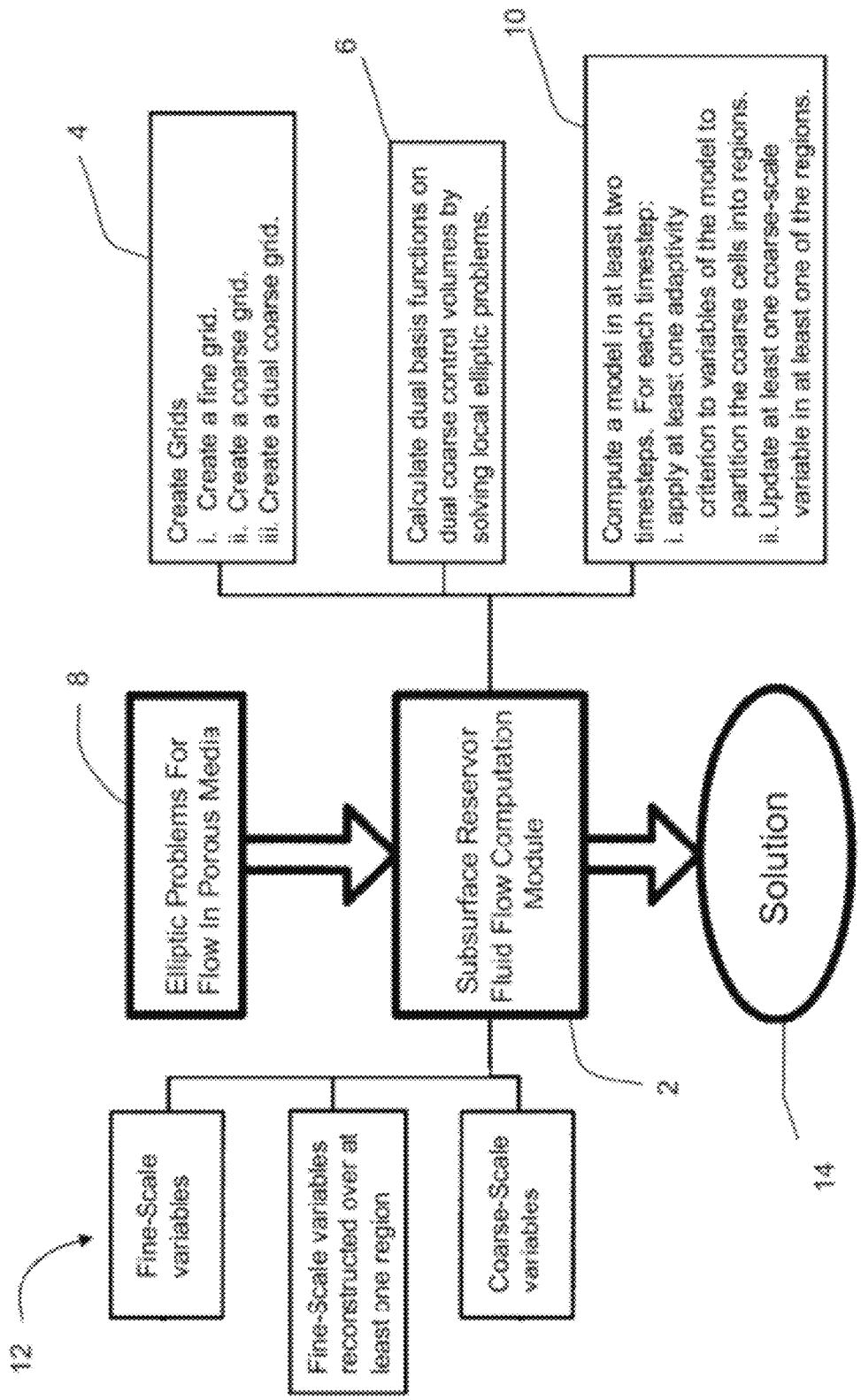
FIG. 1 is a block diagram of an example computer structure for use in modeling fluid flow in a subsurface reservoir.

FIG. 1 depicts a block diagram of an example computer-implemented system for use in modeling fluid flow in a subsurface reservoir using a model. The system can include a computation module 2 for performing the computations discussed herein. The computation of the model can be performed at process 4 on a system of grids (e.g., a fine grid, a coarse grid, and a dual coarse grid) as discussed in herein. In the practice of the system and method, dual basis functions can be calculated at process 6 on the dual coarse control volumes of the dual coarse grid by solving local elliptic problems 8 for fluid flow in porous media. The model can include one or more variables 12 representative of fluid flow in the subsurface reservoir, at least one of these variables being responsive to these calculated dual basis functions.

As performed at process 10 in FIG. 1, modeling fluid flow in the subsurface reservoir using a model can include computing a model in at least two timesteps. For each timestep, computing the model can include partitioning coarse cells of a coarse grid into regions by applying at least one adaptivity criterion to variables of the model and updating a coarse-scale variable of the model in at least one of the regions. As discussed herein, a coarse-scale variable in a region can be updated with a respective fine-scale variable that is reconstructed over the region.

A multi-scale finite volume (MSFV) method is used for computing the model. Performance of the MSFV method can include calculating the dual basis functions on the dual control volumes of the dual coarse grid by solving elliptic problems (at processes 4 and 6 of FIG. 1) and constructing fine-scale variables (at process 10).

The result of the computation over the two or more timesteps can be, but is not limited to, a computed model including the updated coarse-scale variable or variables representative of fluid flow in the subsurface reservoir.

The solution or result 14 of the computation can be displayed or output to various components, including but not limited to, a user interface device, a computer readable storage medium, a monitor, a local computer, or a computer that is part of a network.

To explain an embodiment of a MSFV method, consider an elliptic problem for two phase, incompressible flow in heterogeneous porous media given by $$\nabla \cdot \lambda \nabla p = q_o + q_w \qquad \text{(Equation 1)}$$

$$\Phi \frac{\partial S}{\partial t} + \nabla \cdot (f_o u) = -q_o. \qquad \text{(Equation 2)}$$

on domain $\Omega$. The total velocity becomes $$u = -\lambda \nabla p \qquad \text{(Equation 3)}$$

with total mobility and oil-phase fractional flow respectively given as $$\lambda = \lambda_o + \lambda_w = k(k_o + k_w) \quad \text{(Equation 4)}$$

$$f_o = \frac{k_o}{k_o + k_w} \quad \text{(Equation 5)}$$

Here, $k_j \equiv k_{rj}/\mu_j$ and $\lambda_j \equiv kk_j$ for $j \in \{o, w\}$. Notation $S \equiv S_o$ will be used hereinafter. The system assumes that capillary pressure and gravity are negligible. The discretized equations of (1) and (2) in finite volume formulation can be solved numerically and are a representative description of the type of systems that are typically handled by a subsurface reservoir flow simulator.

Figure 2:
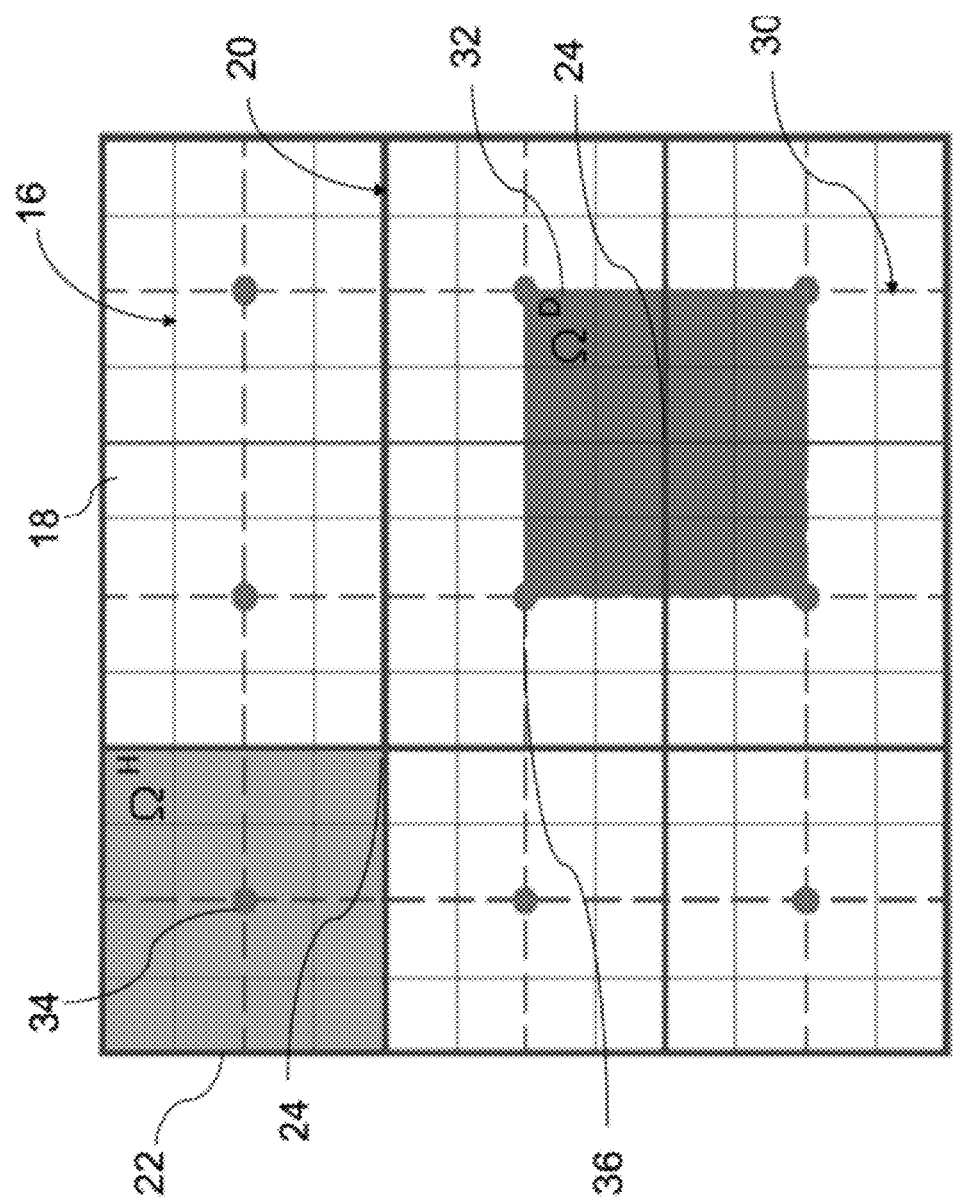
FIG. 2 is a schematic view of a 2D fine-scale grid domain partitioned into a primal coarse grid (bolded solid lines) and dual coarse-grid (dashed lines).

To illustrate further an MSFV technique, FIG. 2 depicts a grid system which includes a fine-scale grid 16, a conforming primal coarse-grid 20 shown in bolded solid line, and a conforming dual coarse-grid 30 shown in dashed line. The primal coarse-grid 20 has M cells 22 and N nodes 24 and is constructed on the original fine-grid 16 including fine cells 18. Each primal coarse cell 22, $\Omega_i^H$ ($i \in \{1, \ldots, M\}$), includes multiple fine cells 18. The dual coarse-grid 30, which also conforms to the fine-grid, is constructed such that each dual coarse control volume or cell 32, $\Omega_j^D$ ($j \in \{1, \ldots, N\}$), contains exactly one node 24 of the primal coarse-grid in its interior. Generally, each node 24 is centrally located in each dual coarse cell 32. The dual coarse-grid 30 also has M nodes 34, $x_i (i \in \{1, \ldots, M\})$, each located in the interior of a primal coarse cell 22, $\Omega_i^H$. Generally, each dual coarse node 34 is centrally located in each primal coarse cell 22. For example, the dual coarse grid 30 is generally constructed by connecting nodes 34, which are contained within adjacent primal coarse cells 22. Each cell in the dual coarse grid has $N_c$ corners 36 (four in two dimensions and eight in three dimensions).

Due to the architecture of the multi-scale finite volume method, variables in the multi-scale finite volume method are typically not defined uniformly as node or cell-center variables. For example, saturation is generally given as a cell-average value, and pressure as a value at the cell-center. Furthermore, fluid velocity (flux) is computed at the interface of two adjacent cells. The transmissibility and fractional flow, relevant to the mass conservation for each cell, are naturally given as a variable at the interface of cells. One skilled in the art will appreciate that the coarse-scale variables are defined so that mass conservation in the coarse-scale can be formulated in a consistent way.

In the multi-scale finite volume method, a set of dual basis functions, $\Theta^i_j$, is constructed for each corner of each dual coarse cell 32, $\Omega_j^D$. The basis functions in the dual coarse-grid can be employed to construct prolongation and restriction operators for pressure. Accordingly, numerical basis functions are constructed for the dual coarse grid 30, $\Omega^D$, in FIG. 2. Four dual basis functions, $\Theta^i$ (i=1,4) (8 basis functions for 3d) are constructed for each cell in dual coarse-grid 30 by solving the elliptic problem $$\nabla \cdot (\lambda \nabla \Theta^i_j) = 0 \text{ on } \Omega_j^D \quad \text{(Equation 6)}$$

with the reduced boundary condition $$\frac{\partial}{\partial x_t}(\lambda \cdot \nabla \Theta^i_j) = 0 \text{ on } \partial \Omega_j^D \quad \text{(Equation 7)}$$

where $X_t$ is the coordinate tangent to the boundary of $\Omega_i^D$. The value of the node $X_k$ of $\Omega_j^D$ is given by $$\Theta^i_j(x_k) = \delta_{ik} \quad \text{(Equation 8)}$$

where $\delta_{ik}$ is the Kronecker delta. By definition $\delta^i_j(x) \equiv 0$ for $x \notin \Omega_j^D$.

Once the basis functions are computed, the prolongation operator ($I_H^h$) can be readily written as $$p_j^h(x) = I_H^h(p^H) = \sum_i \Theta^i_j p_i^H \text{ for } x \in \Omega_j^D \quad \text{(Equation 9)}$$

where the fine grid pressure $p_j^h \in \Omega^h$ and the coarse grid pressure $p_i^H \in \Omega^H$. The prolongation operator ($I_H^h$) is a linear combination of dual grid basis functions. One) skilled in the art will recognize that the coarse-grid pressure $p^H$ is defined as pressure at the center of the grid (point value), in the description of the basis functions.

Figure 3:
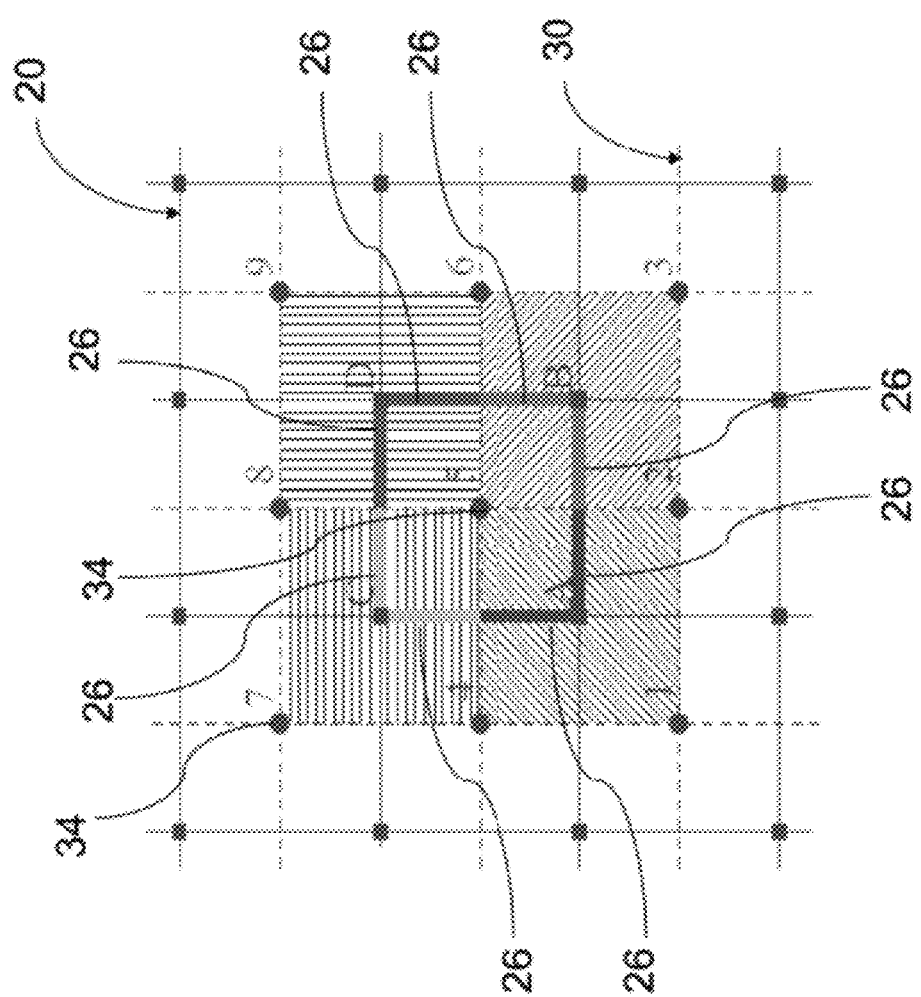
FIG. 3 is a schematic view of a 2D domain partitioned into a primal coarse-grid with nine adjacent coarse cells (1-9) and a dual coarse grid with four adjacent dual coarse cells (A-D).

The coarse-scale grid operator can be constructed from the conservation equation for each coarse-scale cell. FIG. 3 shows eight adjacent coarse-scale or coarse cells shown in solid line, $\Omega_i^D$ =(i=1-4,6-8) for the coarse-scale grid cell $\Omega_5^H$, and dual coarse-scale grid 30, shown in dashed line, with dual coarse-scale cells, $\Omega_j^D$ (j=A,B,C,D), shown by cross-hatching. The first step is to compute the fluxes across the coarse-scale cell interface segments 26, which lie inside $\Omega^H$, as functions of the coarse-scale pressures $p^H$ in the coarse cells 1-9. This is achieved by constructing eight dual basis functions, $\Theta^i$ (i=1,8), one for each adjacent coarse-scale cell. The fine-scale fluxes within $\Omega^H$ can be obtained as functions of the coarse-scale pressures $p^H$ by superposition of these basis functions.

Effective coarse-scale transmissibilities are extracted from the dual basis functions $\Theta^i_j$, $$T_{\alpha,i}^{i_1 i_2} = \int_{\partial \Omega_{i_1 i_2}^H} \sum_{j=1}^N (\lambda_\alpha \cdot \nabla \Theta^i_j) \cdot n d\Gamma \quad \text{(Equation 10)}$$

The vector n is the unit normal of $\partial \Omega_{i_1 i_2}^H$ pointing in the direction from to $\Omega_{i_1}^H$ to $\Omega_{i_2}^H$. The coarse-grid transmissibility indicates the functional dependency of the saturation distribution in the fine-grid. The transmissibility can also be computed as a function of coarse-grid saturations. In Equation (10) the transmissibilities are dependent on two parts; phase mobility and the gradient of the basis functions. In addition, the basis functions are dependent on the underlying permeability field and total mobility. If the total mobility changes substantially, the basis functions can be updated to accurately compute the coarse-scale transmissibilities. Nonetheless, if the total mobility change is small in magnitude, an asymptotic expansion of coarse-scale transmissibilities can be directly employed.

In order to maintain mass conservation in the coarse and fine-grids, volumetric average can be used as the restriction operator for saturation and can be described by $$S_i^H = R_h^H S^h = \frac{1}{V_i} \sum_{l \in \Omega_i^H} v_l S_l^h \quad \text{(Equation 11)}$$

where $v_l$ is the volume of fine cell l and $V_i$ is the volume of coarse cell i. If the phase velocity in the fine-grid is given, the nonlinear fine-grid transport operator can be written as $$A_i^h(S^h) = \sum_{j \in \aleph_i} \frac{k_o(S_{o,ij}^h)}{k_o(S_{o,ij}^h) + k_w(S_{w,ij}^h)} u_{ij} - \beta_i(S_i^{h,n+1} - S_i^{h,n}) \quad \text{(Equation 12)}$$

Here, $\beta_i = \Phi V_i / \beta t$. The $S_{,ij}$ and $u_{ij}$ denote the upwind saturation and the total phase velocity between cells i and j respectively, and $\aleph_i$ denotes the set of cells adjacent to cell i. The coarse-grid total velocity and fractional flow can be defined as $$U_{ij}^H = \sum_{l \in \partial \Omega_{ij}^H} u_l^h \quad \text{(Equation 13)}$$

$$F_{ij}^H = \frac{1}{U_{ij}^H} \sum_{l \in \partial \Omega_{ij}^H} f(S_l^h) u_l^h \quad \text{(Equation 14)}$$

The fractional flow curve $f(S_l^h)$ is a nonlinear function (i.e, S-shaped) of saturation and the multi-phase flow intricately interacts with heterogeneous fine-scale permeability. The coarse-grid fractional flow $F_{ij}^H$ is, in general, a complex nonlinear function of $S^h$ that cannot be easily represented only with a simple function of coarse-grid saturations, $S^H$. However, if the saturation change in a coarse-grid becomes monotonic and slow after the flow front moves through the grid, the coarse-grid fractional flow curve can be estimated from the coarse-grid saturation changes from the previous time step or iteration.

Regarding reconstruction of fine-scale pressure, velocity and saturation, the following are discussed. As described previously, coarse-scale models, such as transmissibility and fractional flow, can be constructed from the underlying fine-scale information. When the coarse-scale variables (i.e., $p_j^H$, $S_j^H$ and $U_{ij}^H$) do not change much, the coarse-scale models can be updated by an asymptotic expansion of coarse-scale variables. However, if coarse-scale variables significantly change, the distribution of fine-scale pressure, velocity and saturations can be reconstructed in order to maintain coarse-scale models within admissible error tolerance.

Figure 4:
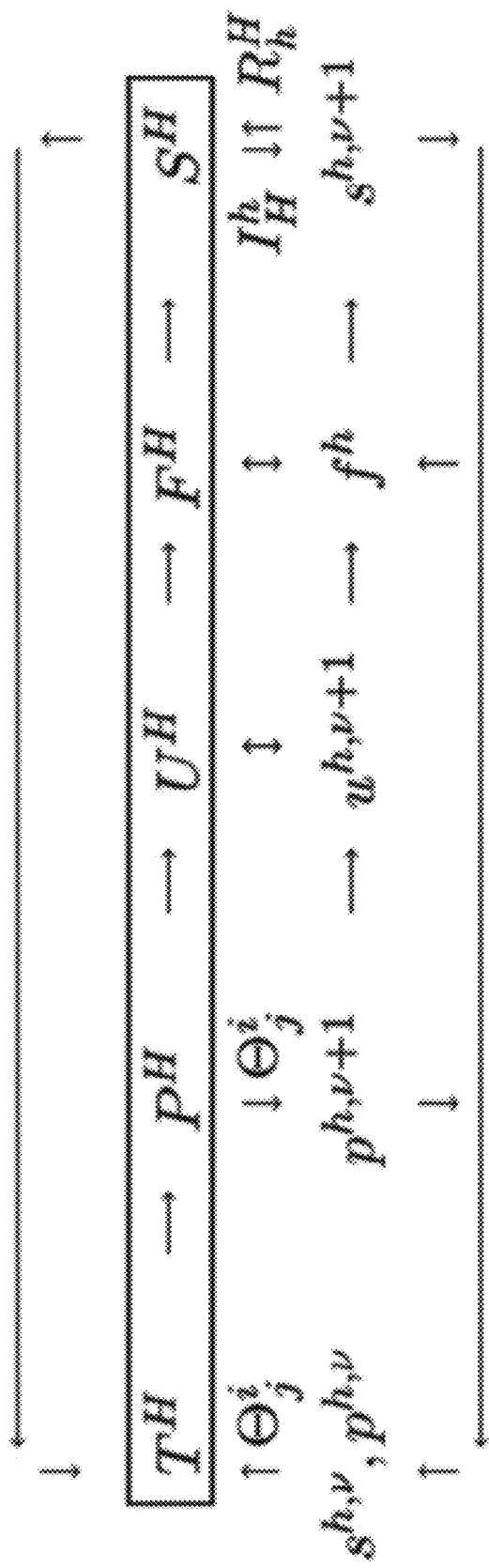
FIG. 4 is a schematic diagram for coarse-scale flow and transport operations with dynamic fine-scale resolution.

The fine-scale variables can be approximately reconstructed from the coarse-scale variables. For example, fine-scale variables, such as pressure and velocities, can be reconstructed from the coarse-scale solution. For new state variables, the basis functions are first updated. As the coarse-scale transmissibilities are computed from basis functions, the coarse-scale conservation equation that yields coarse-scale pressure can be derived. The fine-scale saturations can be obtained by solving the transport equations by the Schwartz-overlap method. A commutative diagram for restriction and prolongation operations between fine-scale and coarse-scale variables is shown in FIG. 4.

Since fine-scale variables in MSFV are constructed in sequence, adaptivity can be extensively applied in the MSFV algorithm to make the reconstruction process computationally efficient. First, the basis functions are adaptively updated. An adaptivity criterion based on the total mobility change in fine-grid can be used. The basis functions are used both to construct both the coarse-scale transmissibilities and the prolongation operator of pressure. To construct conservative fine-scale velocity, one approach is to use Neumann boundary conditions to solve the local problem. Another approach is to directly interpolate fine-grid velocity changes from the coarse-grid velocity changes if the velocity changes become small. This interpolation scheme can greatly improve numerical efficiency, and creates negligible numerical degradation if it is applied to a domain where the linear approximation can hold.

A fast interpolation of saturation that is locally conservative in coarse-grid can also be applied. If the saturation distribution pattern remains invariant between iterations or time steps, the fine-grid saturation can be directly computed from coarse-grid saturation changes.

A linear interpolation scheme can be used, assuming that the relative saturation change in a coarse-grid ($\xi_1$) does not vary much from the previous iteration. It is a plausible approximation for a coarse-grid in which the saturation changes are slow, such as behind a steep saturation front. One skilled in the art will recognize, however, that the accuracy of this interpolator depends on the assumption of invariant $\xi_1$ from the previous iteration. Domains in which this interpolator approach can be safely applied to yield high numerical efficiency and accuracy have been identified.

The multi-scale finite volume framework is a general approach for sequential solution of the flow (pressure and total velocity) and transport (saturation) problems. It can provide a sequential fully implicit scheme. Each time-step consists of a Newton loop and the multi-phase flow problem can be solved iteratively by solving the pressure solution, constructing the fine-grid velocity field u from the pressure solution, and solving the transport equation on the fine-grid by using the constructed fine-scale velocity field u.

For coarse-grid transport equations a sequential fully implicit formulation for flow and transport equations can be written as $$\sum_{j \in \aleph_i} T_{ij}(S_{i,j}^{H,\upsilon})(p_j^H - p_i^H) = Q_i^H \quad \text{(Equation 15)}$$

$$U_{i,j}^{H,\upsilon+1} = T_{ij}(S_{i,j}^{H,\upsilon})(p_j^H - p_i^H) \quad \text{(Equation 16)}$$

$$\frac{V}{\Delta t}(S_i^{H,\upsilon+1} - S_i^{H,n}) = \sum_{j \in \aleph_i} U_{i,j}^{H,\upsilon+1} F_{ij}^H(S_{i,j}^{H,\upsilon+1}) - Q_i^H \quad \text{(Equation 17)}$$

The coarse-grid pressure ($p_j^{H,\nu}$), velocity ($U_i^{H,\nu}$), and saturation ($S_{ij}^{H,\nu}$) can be known from the previous time step or iteration (v). From Equations (15) and (16), the new coarse-grid pressure and velocity, $p_j^{H,\nu}$ and $U_i^{H,\nu+1}$, can be obtained. For numerical stability, an implicit formulation, such as Backward Euler, can be employed in solving Equation (17) for saturation. Due to the nonlinear dependency of saturation in fractional flow $F(S^H)$ an iterative method, such as Newton's method, is generally employed to solve Equation (17). As mentioned previously herein, the fractional flow in coarse-scale is linearly interpolated from the previous iteration only if the change in saturation is minor. However, if the coarse-grid block experiences a rapid saturation change or redistribution, the fractional flow can be updated based on the reconstructed saturation distribution in the fine-scale. A strong nonlinearity in fractional flow can yield large time-step truncation errors if the implicit formulation method, such as the Backward Euler method, applies in time integration. This time truncation can be reduced by a higher order explicit or implicit iterative method, such as the Runge-Kutta method.

With respect to adaptivity based on indirect error measurement, the following is provided. The upscaling errors in a coarse-scale model can be measured unequivocally if a reference solution is computed with a fine-scale model. The $L_2$ norms of pressure velocity, and saturation errors can be defined by $$e_p = \frac{\|p_{ms}^H - p_f^H\|_2}{\|p^{init}\|}, \quad \text{(Equation 18)}$$

$$e_u = \frac{\|U_{ms}^H - U_f^H\|_2}{\|U^{max}\|},$$

$$e_s = \|S_{ms}^H - S_f^H\|_2$$

Here, $p_{ms}^H$, $U_{ms}^H$, and $S_{ms}^H$ are the upscaled pressure, velocity, and saturation, computed from the upscaled operators, respectively; and $p_f^H$, $U_f^H$, $S_f^H$, and f are the reference solution computed from the fine-scale simulation results. The restriction operator for pressure is a point sampling at the cell center, whereas that for velocity is the sum of velocity (flux) at the cell interface. The restriction operator for saturation is the volume average for the coarse-grid. If the fine-grid solution is available, the reference solution can be straightforwardly computed based on the definitions of coarse-grid variables. However, the reference solution from the fine-scale simulation is typically not available and the error measures in Equations (18) cannot be computed for most practical models. If the upscaled parameters of coarse-grid variables are, however, frequently updated, the coarse-scale model generally yields the same accuracy as with the original MSFV model. Therefore, since the fine-scale simulation results obtained using the MSFV method typically are in excellent agreement with the fine-scale simulation results (e.g., $e_p \sim 10^{-5}$ and $e_s \sim 10^{-4}$), errors in the upscaled model can indirectly be estimated from the changes of coarser-scale variables.

Adaptive computation can be applied based on the estimated errors by partitioning the model into numerous regions. For example, the model can be split into three regions: Region 1 in which the injection fluid has not invaded; Region 2 in which the injection fluid invades and the strong fluid redistribution occurs due to the interactions of fluid flow and heterogeneity in permeability; and Region 3 in which the invading fluid has swept the grid cell and the saturation tends to change slowly.

The transition between regions can be identified by applying an adaptivity criterion to the coarse-scale grid. The adaptivity criterion can be based on the saturation changes and total velocity changes in the coarse-scale grid. For example, the transition from Region 1 to Region 2 can be detected for the coarse-scale grid using an adaptivity criterion represented by:

$$\text{Region 1} \rightarrow \text{Region 2}: \Delta S_j^H > \Delta_1 \quad \text{(Equation 19)}$$

where $\Delta_1$ is a threshold value. In an example, $\Delta_1$ is greater than zero. In another example, $\Delta_1$ can have a value ranging from about $10^{-5}$ to about $10^{-1}$. The transition from Region 2 to Region 3 can be identified by the changes in both saturation and velocity, and the adaptivity criterion can be represented by:

$$\text{Region 2} \rightarrow \text{Region 3}: \Delta S_j^H < \Delta_2 \text{ and } \Delta U_j^H / \mu U^{max} \| < \Delta_3 \quad \text{(Equation 20)}$$

where $\Delta_2$ and $\Delta_3$ are threshold values. In an example, $\Delta_2$ is greater than about $10^{-3}$ to $10^{-1}$. In another example, $\Delta_2$ can have a value ranging from about $10^{-3}$ to $10^{-1}$. In an example, $\Delta_3$ is greater than about $10^{-3}$. In another example, $\Delta_3$ can have a value ranging from about $10^{-3}$ to $10^{-1}$.

In Region 1, the coarse-grid model does not need to be updated; in Region 2 the coarse-grid model is updated with the fine-scale variables reconstructed from the multi-scale finite volume method; and in Region 3 a linear interpolation of the coarse-scale model can be applied with coarse-grid variable changes. The adaptivity criteria can be altered depending on the outcome desired. For example, by tightening the adaptivity criteria in Equations (19) and (20), Region 2 becomes the dominant region and computation becomes more similar to the original multi-scale finite volume method. Those of skill in the art will recognize that tightening the adaptivity criteria can result in the adaptivity criteria becoming restrictive. For example, tightening the adaptivity criteria can indicate that the transition from region 1 to region 2 occurs with a very small saturation change (for example, if $\Delta_1$ is set to about $10^{-5}$), and the transition from region 2 to region 3 occurs once the cell is fully swept and there is a small saturation and velocity change (for example, if $\Delta_2$ and $\Delta_3$ are both set to about $10^{-3}$). If the adaptivity criteria is tightened, the majority of the grid can be considered to be in region 2 and much of the computation requires reconstruction of the fine-scale variables. If the adaptivity criteria in Equations (19) and (20) are defined to be very loose, the adaptive computation becomes close to a conventional upscaled model without dynamic model updates, which can produce inaccurate numerical results of O(1) error. Those of skill in the art will recognize that, if the adaptivity criteria becomes loose, more of the grid falls within regions 1 and 3. As discussed above, the coarse-grid model does not need to be updated in region 1, and in region 3 the coarse-grid variable can be simply interpolated instead of being directly computed.

Computation in Region 2 can be similar to the original MSFV algorithm, where the fine-scale saturation can be reconstructed over the entire grid using the Schwarz Overlap method. However, as discussed above, computation of the original MSFV algorithm can be more computationally expensive. By adding regions 1 and 3, the computational efficiency can be improved. Although the numerical errors may increase with inclusion of regions 1 and 3, the methods disclosed herein can be used to keep the numerical errors advantageously low.

Figure 5A:
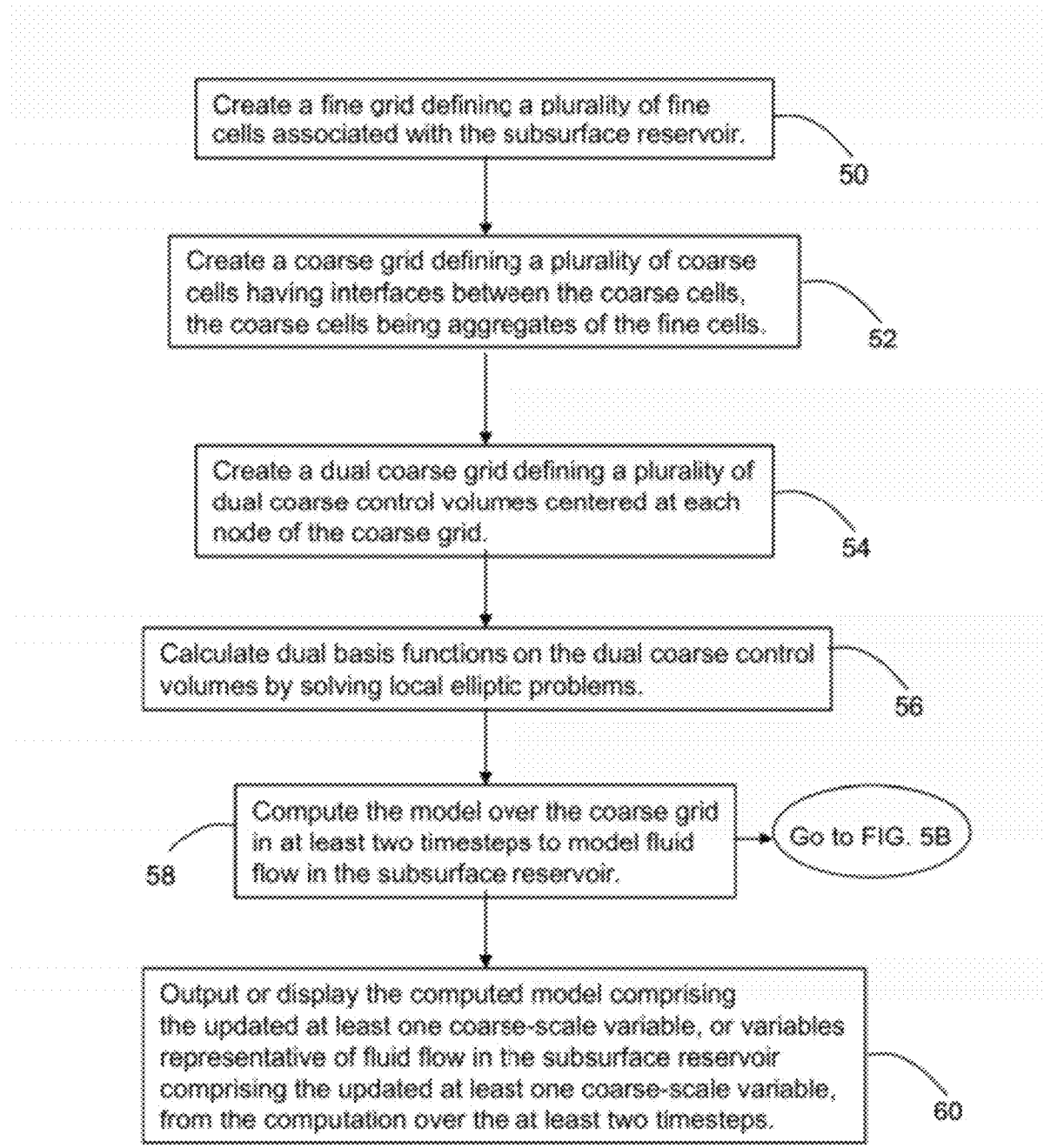
FIGS. 5A-5B show flow charts of an example computation of a model.
Figure 5B:
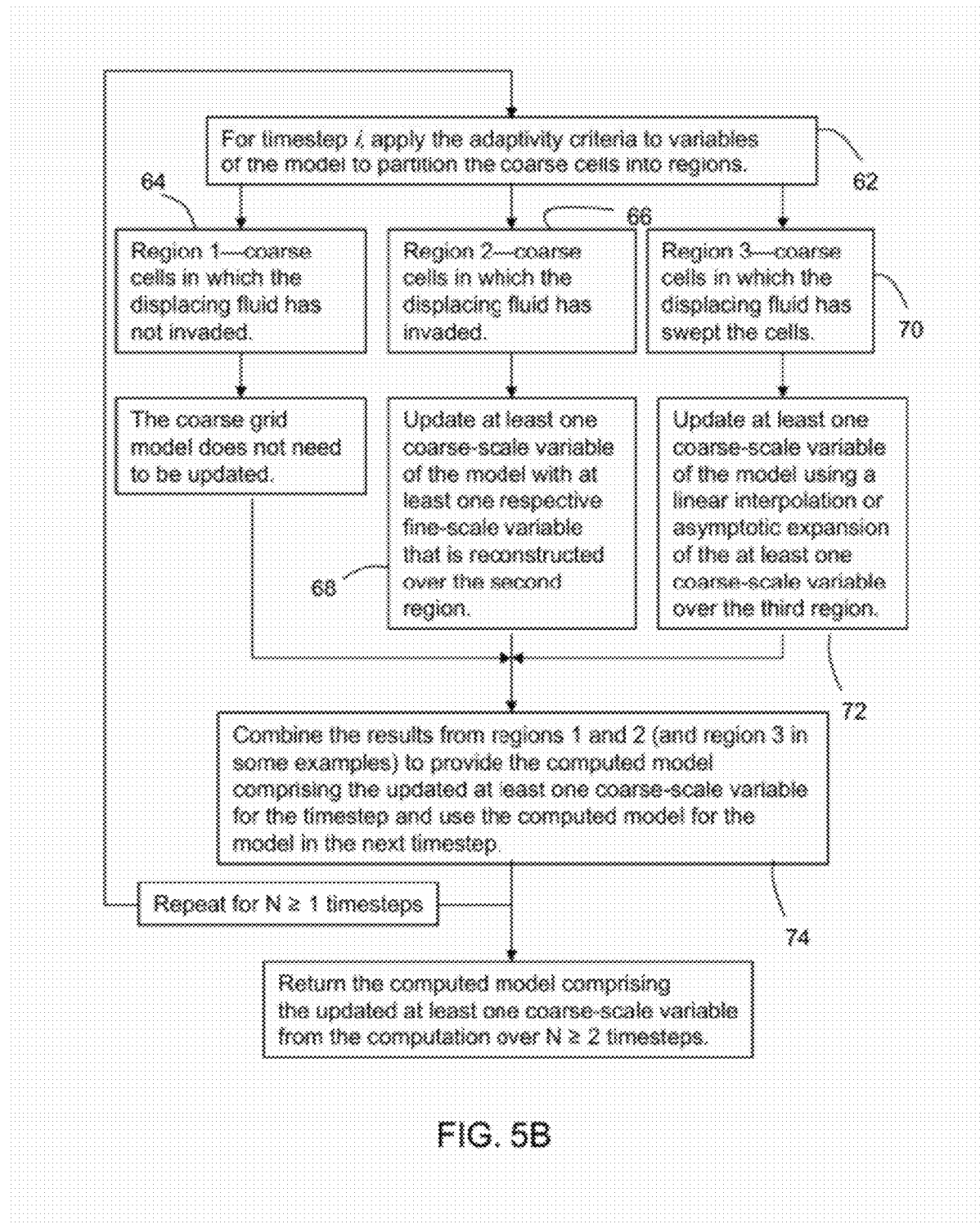

As an example of an operational scenario involving region computations, FIGS. 5A and 5B illustrate various steps that can be performed for modeling fluid flow in a subsurface reservoir with a model. The model can include one or more variables representative of fluid flow in the subsurface reservoir, wherein at least one of the variables representative of fluid flow is responsive to calculated dual basis functions.

As shown in FIG. 5A, the method can include creating a fine grid (process 50), creating a coarse grid (process 52), and creating a dual coarse grid (process 54). Dual basis functions can be calculated on the dual coarse control volumes by solving local elliptic problems (process 56). The model can be computed over the coarse grid in at least two timesteps (process 58). In an example, the result of the computation over the two or more timesteps can be output or displayed (process 60). The result can be, but is not limited to, a computed model including the updated at least one coarse-scale variable, or variables representative of fluid flow in the subsurface reservoir including the updated at least one coarse-scale variable.

As illustrated in FIG. 5B, computing a model for a timestep can include partitioning coarse cells of the coarse grid into regions by applying at least one adaptivity criteria to variables of the model (process 62). The regions can include region 1 (64), corresponding to coarse cells in which a displacing fluid injected into the subsurface reservoir has not invaded, and a region 2 (66), corresponding to coarse cells in which the displacing fluid has invaded. The boundary between the region 1 and the region 2 can be established at the interface between coarse cells that satisfy a first adaptivity criterion. At least one coarse-scale variable of the model in region 2 can be updated with at least one respective fine-scale variable (associated with the fine cells) that is reconstructed over region 2 (68). The computed model including the updated at least one coarse-scale variable can model fluid flow in the subsurface reservoir for each timestep. The first adaptivity criterion can be satisfied when a change in saturation across an interface between two coarse cells is above a first predetermined saturation threshold. The at least one respective fine-scale variable can be reconstructed based on a non-linear interpolation. For a given timestep, the results from regions 1 and 2 can be combined to provide the computed model including the updated at least one coarse-scale variable for the timestep, and that computed model can be used as the model in the computation in the subsequent timestep (process 74). The computation can be repeated for two or more timesteps.

As also illustrated in FIG. 5B, the regions can also include a region 3 (70), corresponding to coarse cells in which the displacing fluid has swept the cells. The boundary between region 2 and region 3 can be established at the interface between coarse cells that satisfy a second adaptivity criterion. The second adaptivity criterion can be satisfied when a change in saturation across an interface between the two coarse cells is below a second predetermined saturation threshold and a change in velocity across the interface is below a predetermined velocity threshold. For an example computation in which region 3 is included, computing the model can include updating at least one coarse-scale variable in region 3 using a linear interpolation of the at least one coarse-scale variable in region 3 or using an asymptotic expansion of the at least one coarse-scale variable in region 3 (72). For a given timestep, in this example, the results from regions 1, 2 and 3 can be combined to provide the computed model including the updated at least one coarse-scale variable for the timestep, and that computed model can be used as the model in the computation in the subsequent timestep (process 74).

The operational scenarios shown in the flow chart of FIGS. 5A and 5B for a computation of a model over a coarse-grid including the application of the adaptivity criteria can be used to guide homogenization of the upscaling process.

The model can include one or more fluid flow equations and one or more transport equations. The at least one coarse-scale variable can be transmissibility, pressure, velocity, fractional flow, or saturation. When the at least one coarse-scale variable is pressure, the fine-scale pressure can be reconstructed by applying a pressure restriction operator that is a point sampling at the center of the coarse cells. When the at least one coarse-scale variable is velocity, the fine-scale velocity can be reconstructed by applying a velocity restriction operator that is the sum of velocity at the interface of the coarse cells. When the at least one coarse-scale variable is saturation, the fine-scale saturation can be reconstructed by applying a saturation restriction operator that is the volume average saturation for the coarse cells. The methods and systems can further include updating the coarse-scale fractional flow based on the reconstructed saturation distribution in the fine-scale. When the at least one coarse-scale variable is fractional flow and saturation, the fractional flow curve on the coarse grid in a timestep can be estimated from changes in the saturation on the coarse grid from a previous timestep.

In an example implementation of a method, updating at least one coarse-scale variable of the model in region 2 with at least one respective fine-scale variable can include applying a respective prolongation operator to the at least one coarse-scale variable to provide the at least one respective fine-scale variable on the fine grid, applying a finite volume method to the at least one respective fine-scale variable over the fine cells to provide at least one respective fine-scale solution for the at least one fine-scale variable, and applying a respective restriction operator to the at least one respective fine-scale solution to the at least one fine-scale variable to provide the at least one updated coarse-scale variable. The respective prolongation operator can be a linear combination of calculated dual basis functions. The model can include one or more flow equations and one or more transport equations, where the at least one respective fine-scale variable includes pressure, velocity, and saturation. Applying a finite volume method to the at least one respective fine-scale variable can include providing a pressure solution, constructing a fine-scale velocity field from the pressure solution, and solving the one or more transport equations on the fine-grid using the constructed fine-scale velocity field.

EXAMPLE NUMERICAL RESULTS

Figure 6:
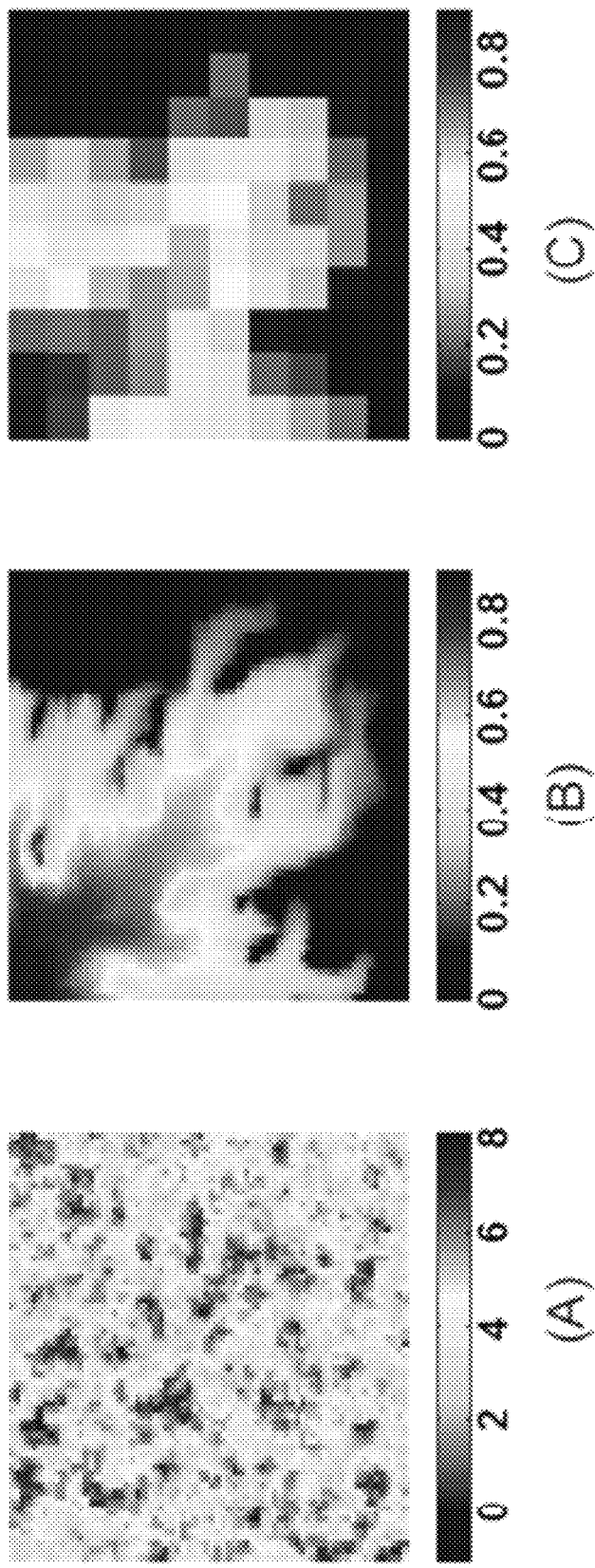
FIGS. 6A-6C are displays representing characteristics of a two-dimensional reservoir model including the permeability distribution (6A), saturation distribution for a fine-scale simulation (6B), and the volumetrically averaged fine-scale solution for a simulation (6C).

The following example is shown to demonstrate the use of indirect-error-based, dynamic upscaling of multi-phase flow in porous media. A two-dimensional reservoir model of 700 ft×700 ft in the physical space with a heterogeneous permeability field with moderate correlation lengths is considered. The permeability field is distributed as log-normal with a mean logarithmic permeability value of 4 millidarcy (mD) with a variance of 2 millidarcy (mD) and a spatial correlation length of 0.2. The permeability is generated by a sequential Gaussian simulation method and the resulting permeability field is depicted in FIG. 6(A). Even though the model is 2-dimensional, a unit thickness of 1 ft is used in the third direction for convenience with regards to the description of operating conditions. The fine-scale grid, 70×70, is uniformly coarsened into coarse-scale grid, 10×10. The upscaling factor is therefore 49, as each coarse block includes 7×7 fine cells.

The reservoir is originally saturated with oil, and water is injected to displace the oil. Water is injected from the upper left corner and production is in the lower right corner. The initial reservoir pressure is 2000 psi. The water injection rate of 50 ft$^3$/day at reservoir condition is constant and the reservoir fluid is produced at the same rate. The injection and production rates are evenly distributed in the coarse-grids, such that the injection is in the left upper coarse-grid and production in the right lower coarse-grid. The fluids are assumed to be incompressible and the quadratic relative permeability model is employed ($k_{ro}=S_o^2$ and $k_{rw}=S_w^2$). The viscosity ratio between water and oil is 1:5, which is typically considered to yield unfavorable displacement.

The fine-scale model is simulated and the saturation distribution is plotted at t=0.3 PVI as shown in FIG. 6(B). The volumetric average of the fine-scale results over the uniform coarse-grid (10×10) is depicted in FIG. 6(C). In this example, the volumetric averaged solution from the fine-scale results is used as the reference solution for the upscaling results. Typically the reference solution, in the average sense, accurately reflects the complex structure of saturation distribution without fine-scale detail.

Figure 7:
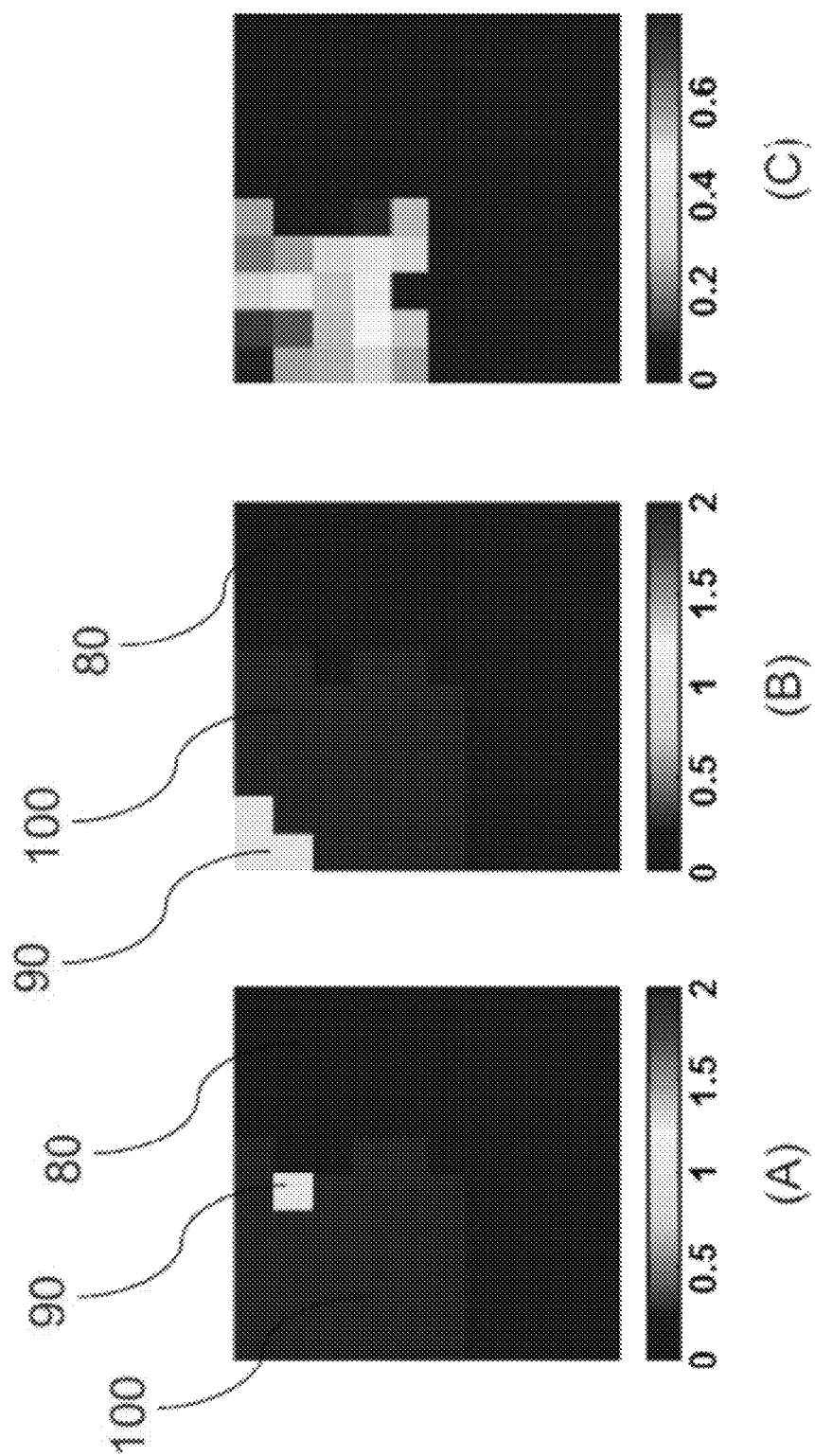
FIGS. 7A-7C are displays representing an upscaled model simulation of a two-dimensional reservoir model including the fine-scale velocity reconstruction (7A), fine-scale saturation reconstruction (7B), and the saturation distribution (7C).
Figure 8:
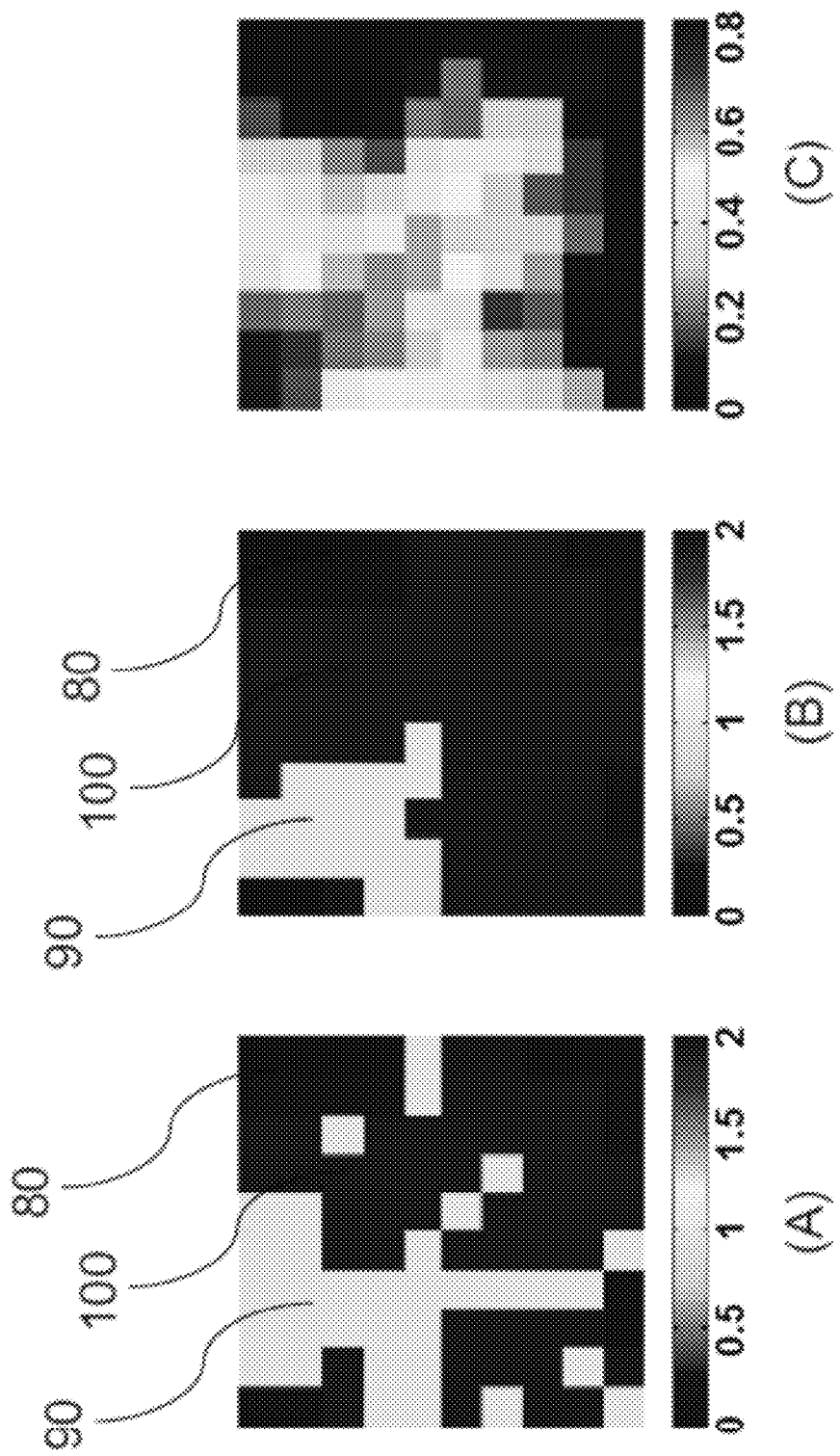
FIGS. 8A-8C are displays representing an upscaled model simulation of a two-dimensional reservoir model including the fine-scale velocity reconstruction (8A), fine-scale saturation reconstruction (8B), and the saturation distribution (8C).

In FIGS. 7 and 8, the numerical results for the dynamic upscaled models are depicted at t=0.1 and 0.3 PVI, respectively. The first two sub-figures ((A) and (B)) of each figure indicates the domains where the fine-scale variables are reconstructed to update (improve) the upscaled model. The fine-scale variables are reconstructed via linear interpolation or non-linear solution. In particular, coarse-cells that do not undergo fine-scale reconstruction are denoted by 80, coarse-cells that undergo linear reconstruction are denoted by 90, and coarse-cells that undergo non-linear reconstruction are denoted by 100.

In FIGS. 7 and 8 the domain for fine-scale variable reconstruction increases as the front saturation area expands. As the front moves into a new area, nonlinear-reconstruction of the fine-scale solution is used. Once the history of saturation development is well-established and the variable changes become modest, the linear reconstruction of fine-scale solution can suffice. In addition, when the area is completely swept by the invading fluid, such as a tailing expansion in Buckley-Leverett flow, an accurate coarse-scale model can be derived without reconstruction of fine-scale variables.

Comparing the upscaled model results (FIG. 7(C)) with those from the reference solution (FIG. 5(C)), it is quite evident that the dynamic upscale model reproduces the reference solution very closely. The detail of front shape in coarse-scale is almost identical in these two solutions.

This new method eliminates inaccuracy associated with the traditional upscaling method which relies on prescribed inaccurate boundary conditions in computing upscaled variables. The new upscaling method achieves high numerical efficiency and provides an excellent agreement with the reference solution computed from fine-scale simulation.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. For example, the method herein can be applied to more complex physical models with compressibility, gravity, capillary force and three-phase flow.

Figure 9:
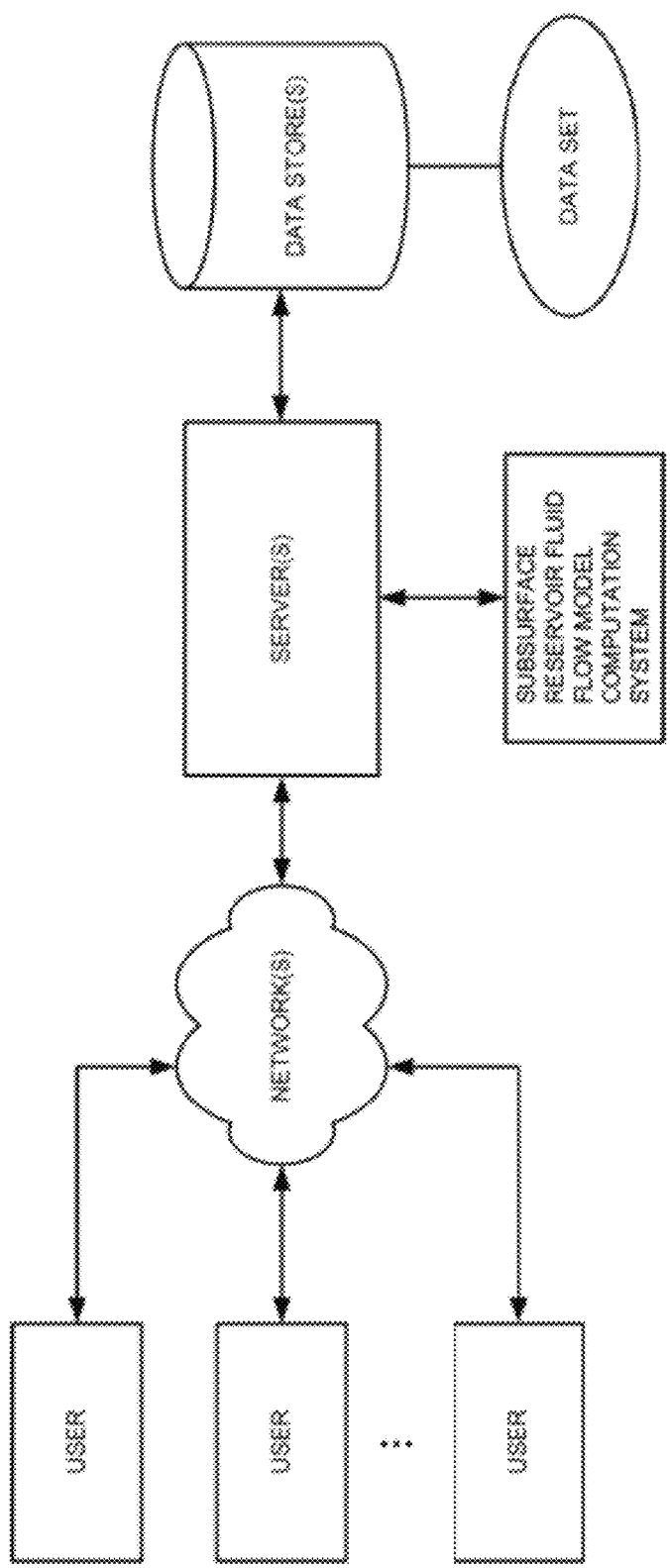
FIG. 9 illustrates an example computer system for use in implementing the methods.

It is further noted that the systems and methods may be implemented on various types of computer architectures, such as for example on a single general purpose computer or workstation, or on a networked system, or in a client-server configuration, or in an application service provider configuration. An exemplary computer system suitable for implementing the methods disclosed herein is illustrated in FIG. 9. As shown in FIG. 9, the computer system to implement one or more methods and systems disclosed herein can be linked to a network link which can be, e.g., part of a local area network to other, local computer systems and/or part of a wide area network, such as the Internet, that is connected to other, remote computer systems. For example, the methods and systems described herein may be implemented on many different types of processing devices by program code including program instructions that are executable by the device processing subsystem. The software program instructions may include source code, object code, machine code, or any other stored data that is operable to cause a processing system to perform the methods and operations described herein. As an illustration, a computer can be programmed with instructions to perform the various steps of the flowchart shown in FIGS. 5A and 5B.

It is further noted that the systems and methods may include data signals conveyed via networks (e.g., local area network, wide area network, internet, combinations thereof), fiber optic medium, carrier waves, wireless networks, and combinations thereof for communication with one or more data processing devices. The data signals can carry any or all of the data disclosed herein that is provided to or from a device.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs). It is noted that data structures describe formats for use in organizing and storing data in databases, programs, memory, or other computer-readable media for use by a computer program. As an illustration, a system and method can be configured with one or more data structures resident in a memory for storing data representing a fine grid, a coarse grid, a dual coarse grid, and dual basis functions calculated on the dual coarse control volumes by solving local elliptic problems. Software instructions (executing on one or data processors) can access the data stored in the data structure for generating the results described herein).

An embodiment of the present disclosure provides a computer-readable medium storing a computer program executable by a computer for performing the steps of any of the methods disclosed herein. A computer program product can be provided for use in conjunction with a computer having one or more memory units and one or more processor units, the computer program product including a computer readable storage medium having a computer program mechanism encoded thereon, wherein the computer program mechanism can be loaded into the one or more memory units of the computer and cause the one or more processor units of the computer to execute various steps illustrated in the flow chart of FIGS. 5A and 5B.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise.

What is claimed is:

1. A computer-implemented method for use in modeling fluid flow in a subsurface reservoir using a model, the method comprising:
    (a) creating a fine grid defining a plurality of fine cells associated with the subsurface reservoir, a coarse grid defining a plurality of coarse cells having interfaces between the coarse cells, the coarse cells being aggregates of the fine cells, and a dual coarse grid defining a plurality of dual coarse control volumes, the dual coarse control volumes being aggregates of the fine cells and having boundaries bounding the dual coarse control volumes;
    (b) calculating dual basis functions on the dual coarse control volumes by solving local elliptic problems; and (c) computing the model, on a computer system, over the coarse grid in a plurality of timesteps; wherein:

the model comprises one or more variables representative of fluid flow in the subsurface reservoir, at least one of the one or more variables representative of fluid flow being responsive to the calculated dual basis functions;

the computing comprises, for each timestep:

(i) partitioning the coarse cells into regions by applying at least one adaptivity criteria to variables of the model; wherein:

the regions comprise a first region corresponding to coarse cells in which a displacing fluid injected into the subsurface reservoir has not invaded, and a second region corresponding to coarse cells in which the displacing fluid has invaded; and a boundary between the first region and the second region is established at the interface between coarse cells which satisfy a first adaptivity criterion; and (ii) updating at least one coarse-scale variable of the model in the second region with at least one respective fine-scale variable that is reconstructed over the second region and is associated with the fine cells; and the computed model, comprising the updated at least one coarse-scale variable, models fluid flow in the subsurface reservoir for each timestep.

2. The method of claim 1, further comprising outputting or displaying the computed model comprising the updated at least one coarse-scale variable.

3. The method of claim 1, wherein the first adaptivity criterion is satisfied when a change in saturation across an interface between the two coarse cells is above a first predetermined saturation threshold.

4. The method of claim 1, wherein the at least one respective fine-scale variable is reconstructed based on a non-linear interpolation.

5. The method of claim 1, wherein the model comprises one or more fluid flow equations and one or more transport equations.

6. The method of claim 1, wherein the at least one coarse-scale variable is transmissibility, pressure, velocity, fractional flow, or saturation.

7. The method of claim 6, wherein the at least one coarse-scale variable is pressure reconstructed by applying a pressure restriction operator that is a point sampling at the center of the coarse cells.

8. The method of claim 6, wherein the at least one coarse-scale variable is velocity reconstructed by applying a velocity restriction operator that is the sum of velocity at the interface of the coarse cells.

9. The method of claim 6, wherein the at least one coarse-scale variable is saturation reconstructed by applying a saturation restriction operator that is the volume average saturation for the coarse cells.

10. The method of claim 1, wherein the updating at least one coarse-scale variable of the model in the second region with at least one respective fine-scale variable comprises:

applying a respective prolongation operator to the at least one coarse-scale variable to provide the at least one respective fine-scale variable on the fine grid, the respective prolongation operator being a linear combination of the calculated dual basis functions;

applying a finite volume method to the at least one respective fine-scale variable over the fine cells to provide at least one respective fine-scale solution for the at least one fine-scale variable; and applying a respective restriction operator to the at least one respective fine-scale solution to the at least one fine-scale variable to provide the at least one updated coarse-scale variable.

11. The method of claim 10, wherein the model comprises one or more flow equations and one or more transport equations; wherein the at least one respective fine-scale variable comprises pressure, velocity, and saturation; and wherein the step of applying the finite volume method to the at least one respective fine-scale variable comprises:

providing a pressure solution;

constructing a fine-scale velocity field from the pressure solution; and solving the one or more transport equations on the fine-grid using the constructed fine-scale velocity field.

12. A computer-implemented method for use in modeling fluid flow in a subsurface reservoir, the method comprising:

(a) creating a fine grid defining a plurality of fine cells associated with the subsurface reservoir, a coarse grid defining a plurality of coarse cells having interfaces between the coarse cells, the coarse cells being aggregates of the fine cells, and a dual coarse grid defining a plurality of dual coarse control volumes, the dual coarse control volumes being aggregates of the fine cells and having boundaries bounding the dual coarse control volumes;

(b) calculating dual basis functions on the dual coarse control volumes by solving local elliptic problems;

(c) for a first timestep, partitioning the coarse cells into regions by applying at least one adaptivity criteria to variables representative of fluid flow in the subsurface reservoir that are responsive to the calculated dual basis functions; wherein:

the regions comprise a first region corresponding to coarse cells in which a displacing fluid injected into the subsurface reservoir has not invaded, and a second region corresponding to coarse cells in which the displacing fluid has invaded; and a boundary between the first region and the second region is established at the interface between coarse cells which satisfy a first adaptivity criterion;

(d) updating at least one coarse-scale variable in the second region with at least one respective fine-scale variable that is reconstructed over the second region and is associated with the fine cells;

(e) repeating steps (c) and (d) over at least one additional timestep; and (f) outputting or displaying the variables representative of fluid flow in the subsurface reservoir comprising the updated at least one coarse-scale variable in the second region over the timesteps.

13. The method of claim 12, wherein the regions further comprise a third region corresponding to coarse cells in which the displacing fluid has swept the cells, wherein a boundary between the second region and the third region is established at the interface between coarse cells which satisfy a second adaptivity criterion, and wherein the second adaptivity criterion is satisfied when a change in saturation across an interface between the two coarse cells is below a second predetermined saturation threshold and a change in velocity across the interface is below a predetermined velocity threshold.

14. The method of claim 13, wherein the computing further comprises updating at least one coarse-scale variable in the third region using a linear interpolation of the at least one coarse-scale variable in the third region.

15. The method of claim 13, wherein the computing further comprises updating at least one coarse-scale variable in the third region by an asymptotic expansion of the at least one coarse-scale variable in the third region.

16. The method of claim 12, wherein the updating at least one coarse-scale variable in the second region with at least one respective fine-scale variable comprises:
   applying a respective prolongation operator to the at least one coarse-scale variable to provide the at least one respective fine-scale variable on the fine grid;
   applying a finite volume method to the at least one respective fine-scale variable over the fine cells to provide at least one respective fine-scale solution for the at least one fine-scale variable; and
   applying a respective restriction operator to the at least one respective fine-scale solution to the at least one fine-scale variable to provide the at least one updated coarse-scale variable.

17. The method of claim 16, wherein the least one coarse-scale variable is pressure and the respective prolongation operator is a pressure prolongation operator that is a linear combination of the dual basis functions.

18. A computer-implemented method for use in modeling fluid flow in a subsurface reservoir, the method comprising:
   (a) creating a fine grid defining a plurality of fine cells associated with the subsurface reservoir, a coarse grid defining a plurality of coarse cells having interfaces between the coarse cells, the coarse cells being aggregates of the fine cells, and a dual coarse grid defining a plurality of dual coarse control volumes, the dual coarse control volumes being aggregates of the fine cells and having boundaries bounding the dual coarse control volumes;
   (b) calculating dual basis functions on the dual coarse control volumes by solving local elliptic problems;
   (c) computing the model, on a computer system, over the coarse grid in a plurality of timesteps; wherein:
      the model comprises one or more variables representative of fluid flow in the subsurface reservoir, at least one of the one or more variables representative of fluid flow being responsive to the calculated dual basis functions;
      the computing comprises, for each timestep:
         (i) partitioning the coarse cells into regions by applying at least two adaptivity criteria to variables of the model; wherein:
            the regions comprise a first region corresponding to coarse cells in which a displacing fluid injected into the subsurface reservoir has not invaded, a second region corresponding to coarse cells in which the displacing fluid has invaded, and a third region corresponding to coarse cells in which the displacing fluid has swept the cells;
            a boundary between the first region and the second region is established at the interface between coarse cells which satisfy a first adaptivity criterion; and
            a boundary between the second region and the third region is established at the interface between coarse cells which satisfy a second adaptivity criterion;
         (ii) updating at least one coarse-scale variable in the second region with at least one respective fine-scale variable that is reconstructed over the second region from a multi-scale finite volume method; and
         (iii) updating at least one coarse-scale variable in the third region using an interpolation of the at least one coarse scale variable in the third region; and
      the computed model, comprising the updated at least one coarse-scale variable in the second region and the updated at least one coarse-scale variable in the third region, models fluid flow in the subsurface reservoir for each timestep; and
   (d) outputting or displaying the computed model, comprising the updated at least one coarse-scale variable in the second region and the updated at least one coarse-scale variable in the third region, over the timesteps.

19. The method of claim 18, wherein the first adaptivity criterion is satisfied when a change in saturation across the interface between the coarse cells is above a first predetermined saturation threshold;
   wherein the second adaptivity criterion is satisfied when a change in saturation across the interface between the coarse cells is below a second predetermined saturation threshold and a change in velocity across the interface is below a predetermined velocity threshold.

20. A computer-implemented system for use in modeling fluid flow in a subsurface reservoir using a model, the system comprising:
   one or more data structures resident in a memory for storing data representing a fine grid, a coarse grid, a dual coarse grid, and dual basis functions calculated on dual coarse control volumes by solving local elliptic problems; and
   software instructions, for executing on one or more data processors, to compute the model over the coarse grid in at least two timesteps; wherein:
      the model comprises one or more variables representative of fluid flow in the subsurface reservoir, at least one of the one or more variables representative of fluid flow being responsive to the calculated dual basis functions;
      the computing comprises, for each timestep:
         (i) partitioning the coarse cells into regions by applying at least one adaptivity criteria to variables of the model; wherein:
            the regions comprise a first region corresponding to coarse cells in which a displacing fluid injected into the subsurface reservoir has not invaded, and a second region corresponding to coarse cells in which the displacing fluid has invaded; and
            a boundary between the first region and the second region is established at the interface between coarse cells which satisfy a first adaptivity criterion; and
         (ii) updating at least one coarse-scale variable of the model in the second region with at least one respective fine-scale variable that is reconstructed over the second region and is associated with the fine cells; and
      the computed model, comprising the updated at least one coarse-scale variable, models fluid flow in the subsurface reservoir for each timestep.

* * * * *